(12) United States Patent
Kumar et al.

(10) Patent No.: US 11,164,694 B2
(45) Date of Patent: Nov. 2, 2021

(54) LOW-SPURIOUS ELECTRIC-FIELD INDUCTOR DESIGN

(71) Applicant: Apple Inc., Cupertino, CA (US)

(72) Inventors: Daniel P. Kumar, Fremont, CA (US); Frank Y. Yuan, Palo Alto, CA (US); Xinbo He, Santa Clara, CA (US); Rajarshi Paul, Los Gatos, CA (US); Meng Chi Lee, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/586,606

(22) Filed: Sep. 27, 2019

(65) Prior Publication Data

US 2021/0098187 A1 Apr. 1, 2021

(51) Int. Cl.
| | |
|---|---|
| *H02M 3/158* | (2006.01) |
| *H01F 17/00* | (2006.01) |
| *H01F 27/28* | (2006.01) |
| *H01F 27/29* | (2006.01) |
| *H02M 1/00* | (2006.01) |

(52) U.S. Cl.
CPC .......... *H01F 27/292* (2013.01); *H02M 3/158* (2013.01); *H02M 1/009* (2021.05); *H02M 3/1582* (2013.01)

(58) Field of Classification Search
CPC ........... H02M 2001/009; H02M 3/158; H02M 3/1582; H01F 2017/002; H01F 27/2804; H01F 17/0006; H01F 2017/0073
See application file for complete search history.

(56) References Cited

U.S. PATENT DOCUMENTS

| | | | | | |
|---|---|---|---|---|---|
| 5,166,965 | A | * | 11/1992 | Collier | H02M 7/10 336/200 |
| 5,410,467 | A | * | 4/1995 | Smith | H02M 3/158 363/131 |
| 5,492,856 | A | * | 2/1996 | Ikeda | H01L 27/08 257/E27.046 |
| 5,500,552 | A | * | 3/1996 | Ikeda | H01L 27/08 257/531 |
| 6,084,515 | A | * | 7/2000 | Maitin | G08B 13/2411 340/572.3 |

(Continued)

OTHER PUBLICATIONS

Chen, Dong, et al, Image downloaded from "A Scalable Model of On-Chip Inductor Including Tunable Dummy Metal Density Factor," Published in: IEEE Transactions on Components, Packaging and Manufacturing Technology ( vol. 9 , Issue: 2 , Feb. 2019)—[online], [Retrieved on May 22, 2020], retrieved from the Internet URL: < https://www.semanticscholar.org/paper/A-Scalable-Model-of-On-Chip-Inductor-Including-Chen-Wu/fa6680c978f0e755d79d699574d7e714f7eba309/figure/0>.>.

(Continued)

*Primary Examiner* — Sisay G Tiku
(74) *Attorney, Agent, or Firm* — Kilpatrick Townsend & Stockton

(57) ABSTRACT

Inductors that generate a reduced spurious electric-field. One example can provide an inductor where the terminals of the inductor are located at positions that reduce the spurious electric field by determining the types of signals conveyed at the terminals of the inductor and then selecting locations for the terminals based on that determination. For example, where a dynamic differential signal is applied to the inductor, the terminals of the inductor can be positioned near a physical center of the inductor.

24 Claims, 13 Drawing Sheets

(56) References Cited

U.S. PATENT DOCUMENTS

| | | | | |
|---|---|---|---|---|
| 6,108,225 | A * | 8/2000 | Iwahori | H02M 7/217 363/132 |
| 6,181,249 | B1 * | 1/2001 | Maitin | G08B 13/2411 340/551 |
| 6,683,510 | B1 | 1/2004 | Padilla | |
| 6,707,367 | B2 | 3/2004 | Castaneda | |
| 6,807,073 | B1 * | 10/2004 | Scarlatescu | H02M 1/4225 363/34 |
| 6,838,970 | B2 * | 1/2005 | Basteres | H01F 17/0006 336/200 |
| 7,339,451 | B2 * | 3/2008 | Liu | H01F 17/04 336/200 |
| 7,629,860 | B2 * | 12/2009 | Liu | H01F 17/0013 333/25 |
| 7,733,207 | B2 * | 6/2010 | Yun | H01F 17/0013 336/200 |
| 8,212,155 | B1 * | 7/2012 | Wright | H01L 23/00 174/259 |
| 8,981,866 | B2 * | 3/2015 | Frye | H01L 23/5223 333/25 |
| 9,307,645 | B2 * | 4/2016 | Mano | H05K 1/165 |
| 9,479,052 | B2 * | 10/2016 | Branca | H02M 3/1582 |
| 9,991,327 | B2 * | 6/2018 | Lee | H01L 23/5227 |
| 10,622,136 | B2 * | 4/2020 | Calanca, Jr. | H01F 41/041 |
| 2006/0145805 | A1 * | 7/2006 | Kim | H01F 5/00 336/200 |
| 2008/0088401 | A1 * | 4/2008 | Wei | H01F 27/289 336/182 |
| 2008/0315850 | A1 * | 12/2008 | Nishida | H02M 3/157 323/284 |
| 2010/0002473 | A1 * | 1/2010 | Williams | H02M 3/158 363/21.06 |
| 2010/0007451 | A1 * | 1/2010 | Yan | H01F 17/043 336/90 |
| 2010/0090781 | A1 * | 4/2010 | Yamamoto | H01L 27/016 333/167 |
| 2011/0089917 | A1 * | 4/2011 | Chen | H02M 3/1584 323/282 |
| 2012/0092119 | A1 * | 4/2012 | Kireev | H01F 17/0013 336/200 |
| 2013/0154591 | A1 * | 6/2013 | Branca | H02M 3/158 323/271 |
| 2014/0218117 | A1 * | 8/2014 | Branca | H02M 3/158 330/297 |
| 2015/0236594 | A1 * | 8/2015 | Branca | H02M 3/1582 345/213 |
| 2016/0148751 | A1 * | 5/2016 | Sakiyama | H01F 30/08 363/16 |
| 2017/0256603 | A1 * | 9/2017 | Lenive | H01L 28/10 |
| 2018/0144858 | A1 * | 5/2018 | Oguchi | H01F 27/2847 |
| 2020/0279686 | A1 * | 9/2020 | Pei | H02J 50/005 |

OTHER PUBLICATIONS

Image downloaded from "The Wonders of electromagnetism, vol. 3 Chip Type Components and the Internal Spiral Concept, " Tech Mag 2020—[online], [Retrieved on May 22, 2020], retrieved from the Internet] URL: <https://www.tdk.com/tech-mag/inductive/003>.

* cited by examiner

LOW-SPURIOUS ELECTRIC-FIELD INDUCTOR DESIGN

BACKGROUND

The number of types of electronic devices that are commercially available has increased tremendously the past few years and the rate of introduction of new devices shows no signs of abating. Devices such as tablet, laptop, desktop, and all-in-one computers, cell phones, wearable computing devices, storage devices, portable media players, navigation systems, adapters, monitors, and others, have become ubiquitous.

The functionality of these devices has likewise greatly increased. This in turn has led to increased complexity inside of these electronic devices. An electronic device can now include one or more processors, radios, displays, and other components.

Many of these circuits can be powered by one or more switching regulator circuits. For example, switching regulators can receive a battery voltage and can boost the battery voltage to a voltage that is higher than the battery voltage. These higher voltages can be used as power supply voltages for these circuits in an electronic device.

These switching regulators rely on the principle that a current in an inductor does not change instantaneously. Such an inductor current can be used to charge a capacitor, where the charged capacitor can then provide an output power supply voltage that is higher than a received input battery voltage. To accomplish this, the terminals of the inductor can be driven by relatively large voltage swings, and these voltage swings can be relatively fast.

The inductors themselves can be coils of looped wire. These wires can be unshielded. The combination of these unshielded wires and large, fast transient voltages can result in these switching regulators generating large spurious electric fields.

These large spurious electric fields can couple to other circuits in the electronic device, thereby degrading their performance. As a result, potentially vulnerable circuits that are near the switching regulators might need to be moved away. Alternatively, it can mean that the switching regulators, or the inductors themselves, might need to be shielded.

Thus, what is needed are inductors that generate a reduced spurious electric-field.

SUMMARY

Accordingly, embodiments of the present invention can provide inductors that generate a reduced spurious electric field. An illustrative embodiment of the present invention can provide an inductor where terminals of the inductor are located at positions that reduce the spurious electric field by determining the types of signals conveyed by the terminals of the inductor and then selecting locations for the terminals based on that determination.

These and other embodiments of the present invention can provide inductors that can be formed of looped coils, or a series of loops, on two levels. That is, the inductor can be formed of two stacked series of loops, though one, three, four, or more than four stacked series of loops can be used. Where two series loops are used, an inductor can include innermost loops near a physical center and outermost loops near a periphery of the inductor for each series of loops. Signals on the innermost loops near the physical center of the inductor can be at least somewhat isolated from outside circuitry by the series of loops of the inductor. This in turn can allow outside circuits to be located more closely to the inductor, thereby saving space in an electronic device. Signals on the outermost loops might not be shielded in this way and can more readily couple to outside circuitry. Accordingly, when a terminal of an inductor conveys a large, dynamic (AC) signal, the terminal can be located near a physical center of the inductor to reduce coupling. Conversely, when a terminal conveys a quiet non-dynamic (DC) signal, the terminal can be implemented on an outermost loop of the inductor in order to simplify board routing.

For example, in a circuit where a dynamic differential voltage is applied to the terminals, the signal level at the electrical center of the inductor can be relatively quiet and non-dynamic. Accordingly, for this circuit configuration, the terminals of the inductor can be implemented at a physical center of the inductor, where the physical center of the inductor provides less coupling to nearby circuits. This can put the quiet electrical center of the inductor at the periphery or an outermost loop of the physical inductor. Since the outermost loop of the inductor can couple more efficiently to neighboring circuits, having a relatively quiet signal on an outermost loop can reduce actual coupling on the neighboring circuits.

In another circuit configuration, a signal across an inductor can be a single-ended signal. For example, a first terminal of an inductor can receive a dynamic single-ended input while a second terminal of an inductor can convey a non-dynamic signal. In response, the first terminal can be located near a physical center of the inductor to reduce coupling. The second terminal can be implemented on the outermost loop of the inductor, since it is non-dynamic and can generate less coupling on nearby circuits. This placement of the second terminal on the outermost loops can help to simplify board routing.

In another circuit configuration, both terminals of an inductor can convey a non-dynamic signal. As a result, both terminals can be implemented on an outermost loop of the physical inductor, since coupling from the terminals is not likely a concern. Placing both terminals on an outermost loop can simply board routing as compared to other placement options.

In another circuit configuration, both terminals can convey dynamic signals, where the dynamic signals are not a differential signal. In such a configuration, the quietest electrical portion of the inductor can be determined. The quietest electrical portion can then be implemented as an outermost loop of the inductor. The terminals can then be positioned as appropriate. In some cases, the terminals can be located at the physical center of the inductor. But where the quietest electrical portion is not near the electrical center, one of the two series of loops can have many more loops than the other, which can wasted space. The space required for the inductor might be reduced by moving the terminals to a physical position away from either the physical center of the inductor or the outermost loops of the inductor.

In some circumstances, the noisiest portion of an inductor might not be a terminal. In such a case, it can be desirable to have the noisiest part of the inductor implemented at the physical center of the inductor, in order to utilize the shielding provided by the loops of the inductor. Again, this can mean that the terminals might be best positioned between the physical center of the inductor and the outermost loops.

These inductors can be manufactured in various ways. For example, each of two or more levels can include a series of coils or loops that are formed as an Archimedean spiral, one branch of a Fermat's spiral, involute, Atzema spiral, or other type of spiral or pattern. In these or other embodiments of the present invention, the series of coils or loops can follow a helix, conchospiral, or other spiral or pattern.

In various embodiments of the present invention, the inductors can be formed by stamping, metal-injection molding, machining, micro-machining, 3-D printing, or other manufacturing process. They can be formed of stainless steel, steel, copper, copper titanium, phosphor bronze, or other material or combination of materials. They can be plated or coated with nickel, gold, or other material.

Embodiments of the present invention can provide inductors that can be located in various types of devices, such as portable computing devices, tablet computers, desktop computers, laptops, all-in-one computers, cell phones, wearable computing devices, storage devices, portable media players, navigation systems, monitors, power supplies, adapters, remote control devices, chargers, and other devices. These inductors can be implemented using various metal layers on an integrated circuit, in a ceramic package, or in other ways.

Various embodiments of the present invention can incorporate one or more of these and the other features described herein. A better understanding of the nature and advantages of the present invention can be gained by reference to the following detailed description and the accompanying drawings.

DESCRIPTION OF ILLUSTRATIVE EMBODIMENTS

Figure 1:
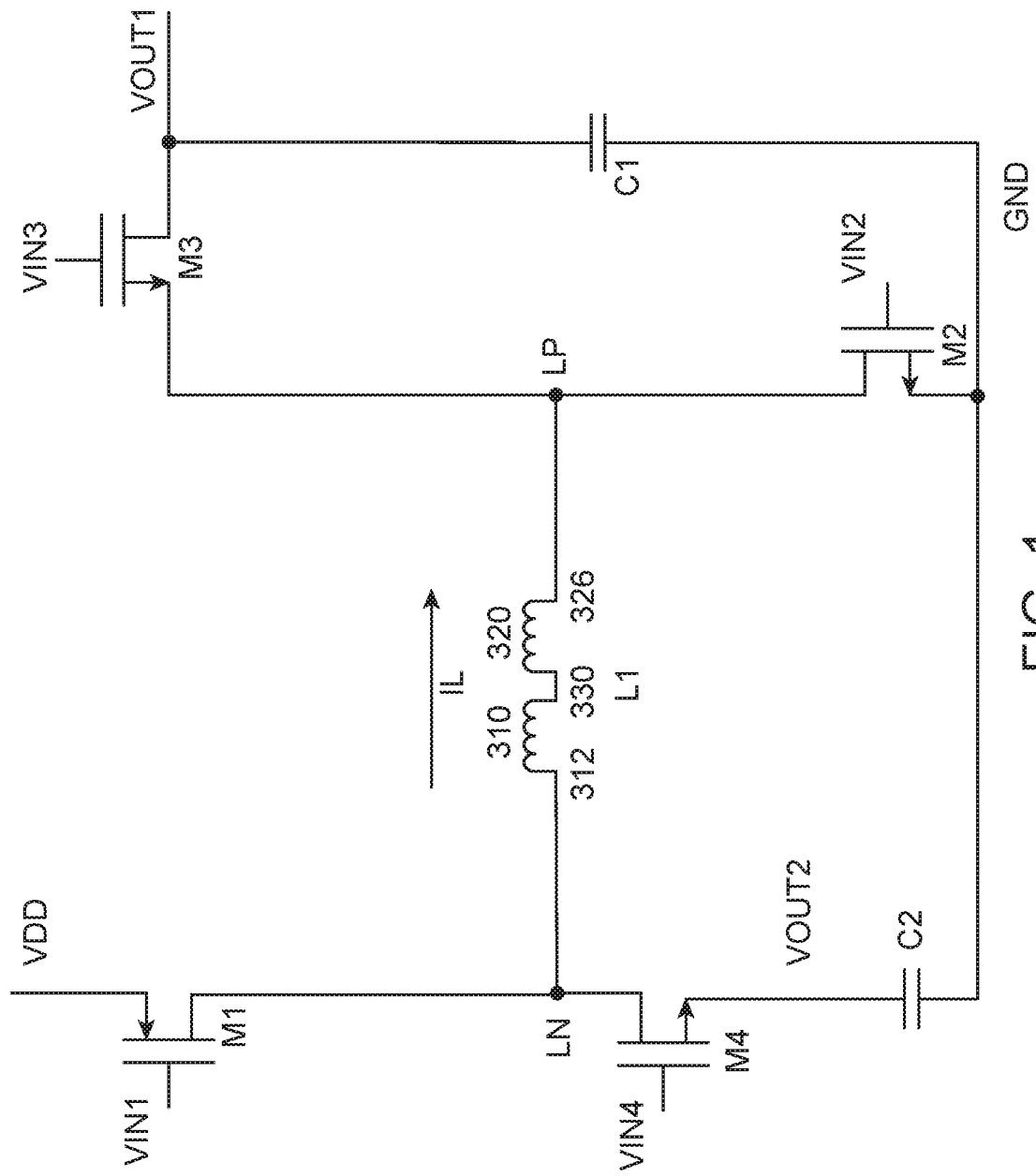
FIG. 1 illustrates a switching regulator according to an embodiment of the present invention.

FIG. 1 illustrates a switching regulator according to an embodiment of the present invention. This figure, as with the other included figures, is shown for illustrative purposes and does not limit either the possible embodiments of the present invention or the claims.

This figure illustrates a single-inductor multiple-output boost regulator. A power supply VDD, which can be a battery voltage, can be received at a source of transistor M1. The boost regulator can boost this voltage and provide regulated outputs VOUT1 and VOUT2 across capacitors C1 and C2, where the output voltage on VOUT1 is higher than the input voltage VDD, and the output voltage on VOUT2 can be negative and higher in magnitude than VDD. The input signals VIN1, VIN2, VIN3, and VIN4 can be provided by a control circuit (not shown) of the boost regulator.

As shown below, the voltages on nodes LN and LP can be dynamic signals. That is, these signals can have relatively large amplitudes and can have a relatively fast edges. When conveyed by terminals 312 and 326 of inductor L1, these voltages might generate a relatively large spurious electric field. Nearby circuits might need to be moved away from this boost regulator to reduce signal coupling.

These and other embodiments of the present invention can provide inductors that generate a low spurious electric field. Since the electric field is reduced, nearby circuits can be moved closer to the inductor or switching regulator, thereby saving board space. That is, even though coupling (which can be thought of as a coupling coefficient) can be increased by moving nearby circuits closer to the inductor, the actual amount of signal coupled to the nearby circuits can be reduced or maintained by generating a lower spurious electric field with the inductor.

Accordingly, inductor L1 can be arranged to generate a low spurious electric field. For example, inductor L1 can be made up of two series of coils or loops 310 and 320. These series of loops can be connected in series by level translation 330. The series of loops 310 and 320 can be on separate levels and at least approximately aligned one over the other in a stacked configuration. Signals at a physical center of inductor L1 can have a reduced coupling to nearby circuits due to shielding effects of the individual loops in the two series of loops 310 and 320. Conversely, the outermost loops 318 and 328 (shown in FIG. 3) of inductor L1 can have most coupling to adjacent circuits. Accordingly, terminals 312 and 326, where large voltages are present, can be implemented near a physical center of inductor L1, where they can be shielded by the series of loops 310 and 320. Since the signals on nodes LP and LP are at least somewhat differential, the electrical center of inductor L1 can be relatively quiet and non-dynamic. Accordingly, the electrical center of inductor L1 can be implemented as the outside or outermost loops 318 and 328 of the series of loops 310 and 320 in order to reduce the actual signal coupling between inductor L1 and nearby circuitry. This can allow circuits (not shown) to be positioned closer to inductor L1, thereby saving space in an electronic device.

Figure 2:
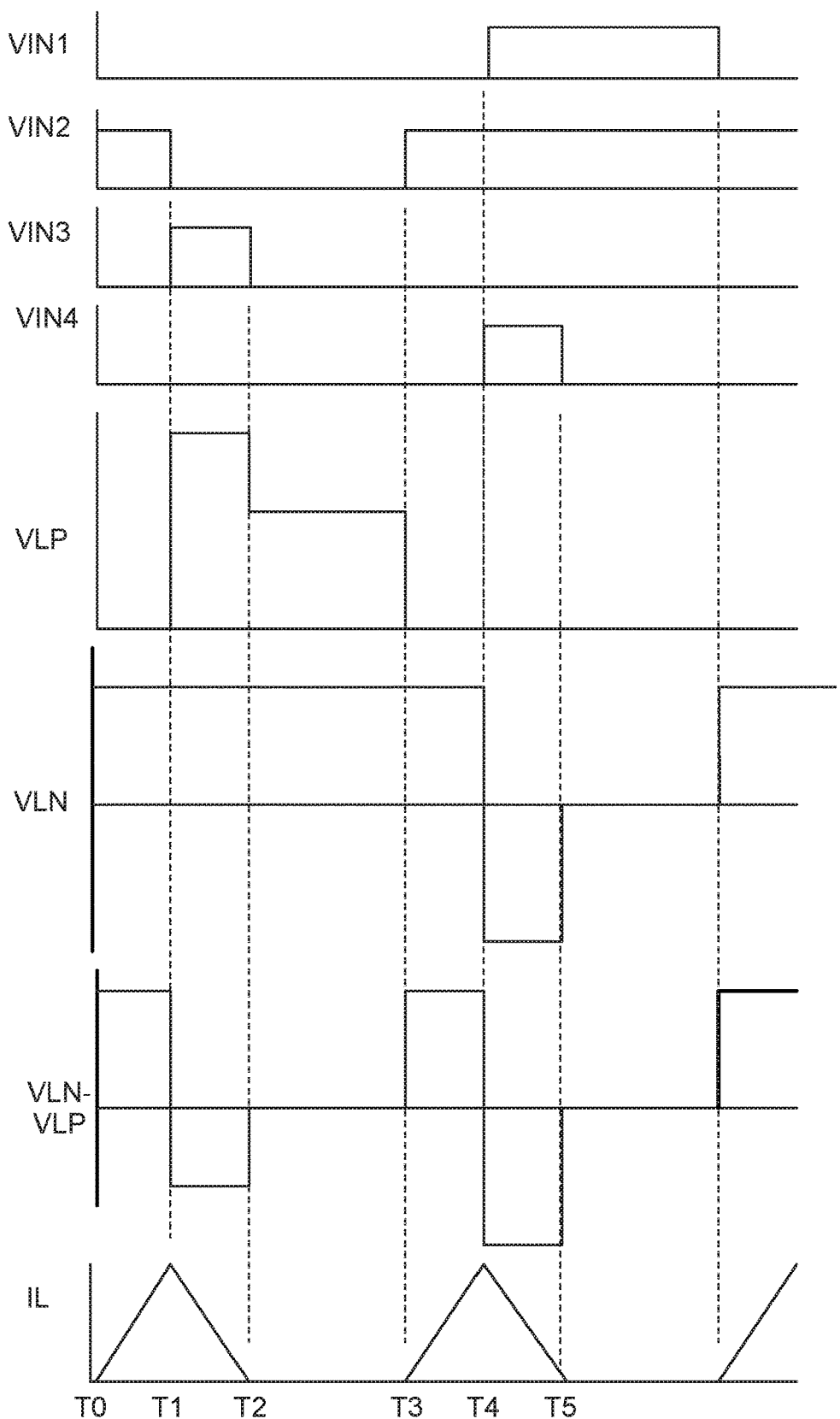
FIG. 2 is a timing diagram illustrating the operation of the circuitry in FIG. 1.

FIG. 2 is a timing diagram illustrating the operation of the circuitry in FIG. 1. At time T0, input signal VIN1 can go low, thereby turning on the p-channel transistor M1 and connecting inductor node LN to VDD. The input signal VIN2 can be high, turning on n-channel transistor M2 and coupling node LP to ground. Accordingly, a current IL can flow through inductor L1. At time T1, the inductor current IL can reach a desired level and VIN2 can be driven low, thereby turning off transistor M2. Input signal VIN3 can go high turning on transistor M3, thereby coupling node LP to the output VOUT1. The current IL can continue to flow through inductor L1 and into the output VOUT1, thereby charging output capacitor C1. At time T2, the inductor current IL can return to zero.

At time T3, input signal VIN2 can return high, once again turning on transistor M2 and grounding node LP. Again, current can flow through inductor L1, reaching a peak at time T4. At time T4, VIN4 can go high, turning on transistor M4 and connecting node LN to VOUT2. VOUT2 can be a negative voltage that can have a magnitude that exceeds the battery or power supply voltage VDD. At time T5, VIN4 can be driven low, thereby disconnecting node LN from VOUT2, thereby allowing the voltage on node LN to return to ground through the inductor L1 and transistor M2.

The voltage swing at nodes LN and LP, and terminals 312 and 326 of inductor L1, can be as large as the difference between the battery voltage VDD and the output voltage VOUT2. In one example, the battery voltage or VDD can be 3 V, the regulated output voltage VOUT1 can be 5 V, and the regulated voltage VOUT2 can be −5 V. Accordingly, the voltage excursions on inductor nodes LP and LN can be up to 8 V in magnitude. The voltage swing at the electrical center of the inductor L1 can be one-half of this voltage difference, which means the magnitude of the voltage excursions at the electrical center of inductor L1 might be only 4 volts. Additionally, the rate of change of the voltage excursions (slew-rate) can also be lower at the electrical center of inductor L1. Accordingly, having the electrical center implemented as the outermost loops of inductor L1 can provide an inductor L1 having a reduced spurious electric field.

Figure 3:
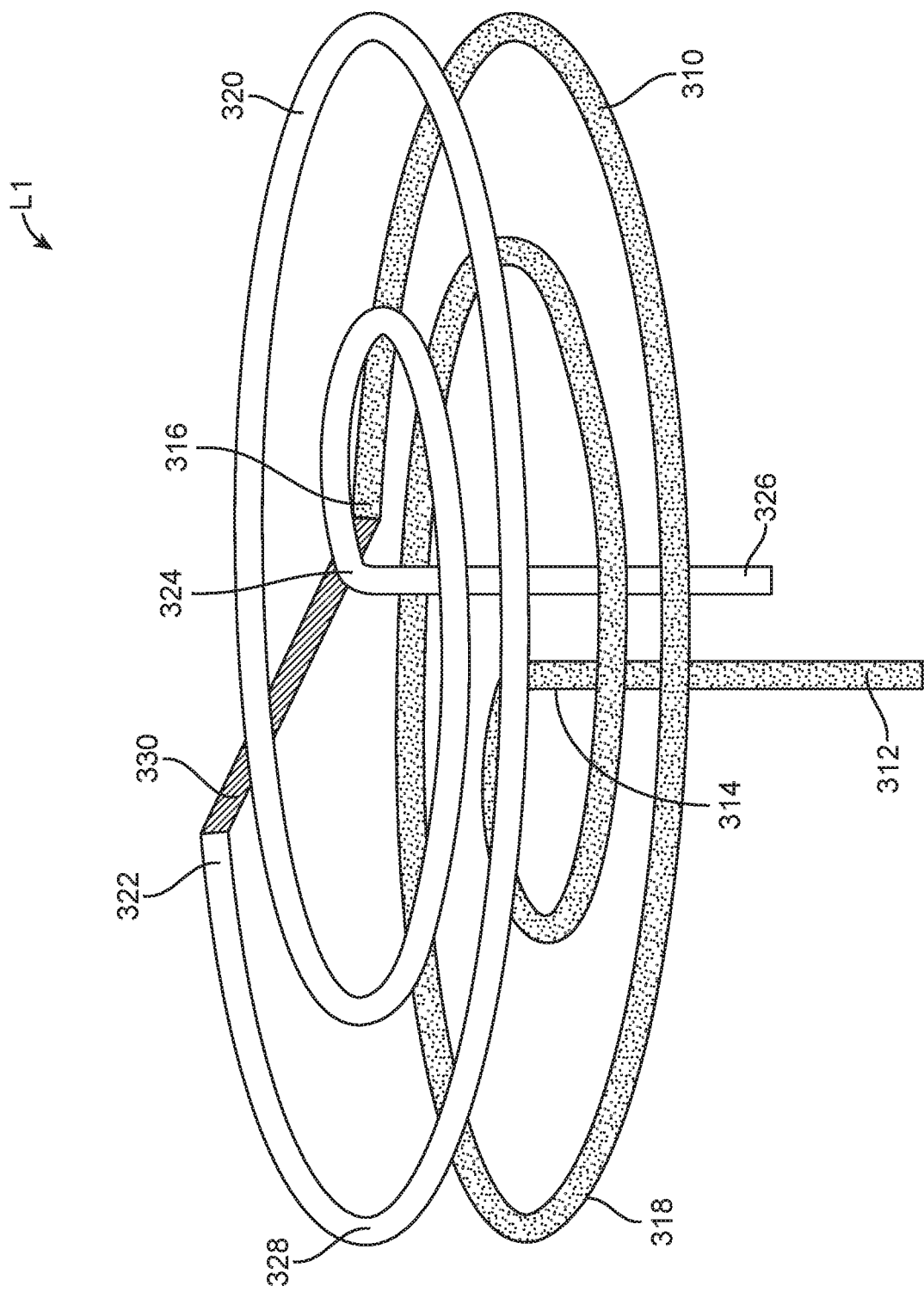
FIG. 3 illustrates an inductor that can be used in the circuitry of FIG. 1.

FIG. 3 illustrates the inductor used in the circuitry of FIG. 1. Inductor L1 can include the first terminal 312. The first terminal 312 can be coupled to a first end 314 of a first series of loops 310. The first series of loops 310 can be arranged in an Archimedean spiral. A second end 316 of the first series of loops 310 can couple to the level translation 330. Level translation 330 can also couple to a first end 322 of the second series of loops 320. The second series of loops 320 can be arranged in an Archimedean spiral. A second terminal 326 can couple to a second end 324 of the first series of loops 320. The first series of loops 310 and the second series of loops 320 can be on their own levels. The first series of loops 310 and the second series of loops 320 can include the same number of loops. The first series of loops 310 and the second series of loops 320 can include a different number of loops. The outermost loops 318 and 328 and level translation 330 can correspond to the electrical center of inductor L1. Where a differential signal is conveyed by terminals 312 and 326, the outermost loops 318 and 328 can be relatively quiet and non-dynamic. This arrangement can reduce actual signal coupling between inductor L1 and nearby circuitry since the signal level on these outermost loops primarily determines the coupling from inductor L1 to adjacent circuits.

Figure 12:
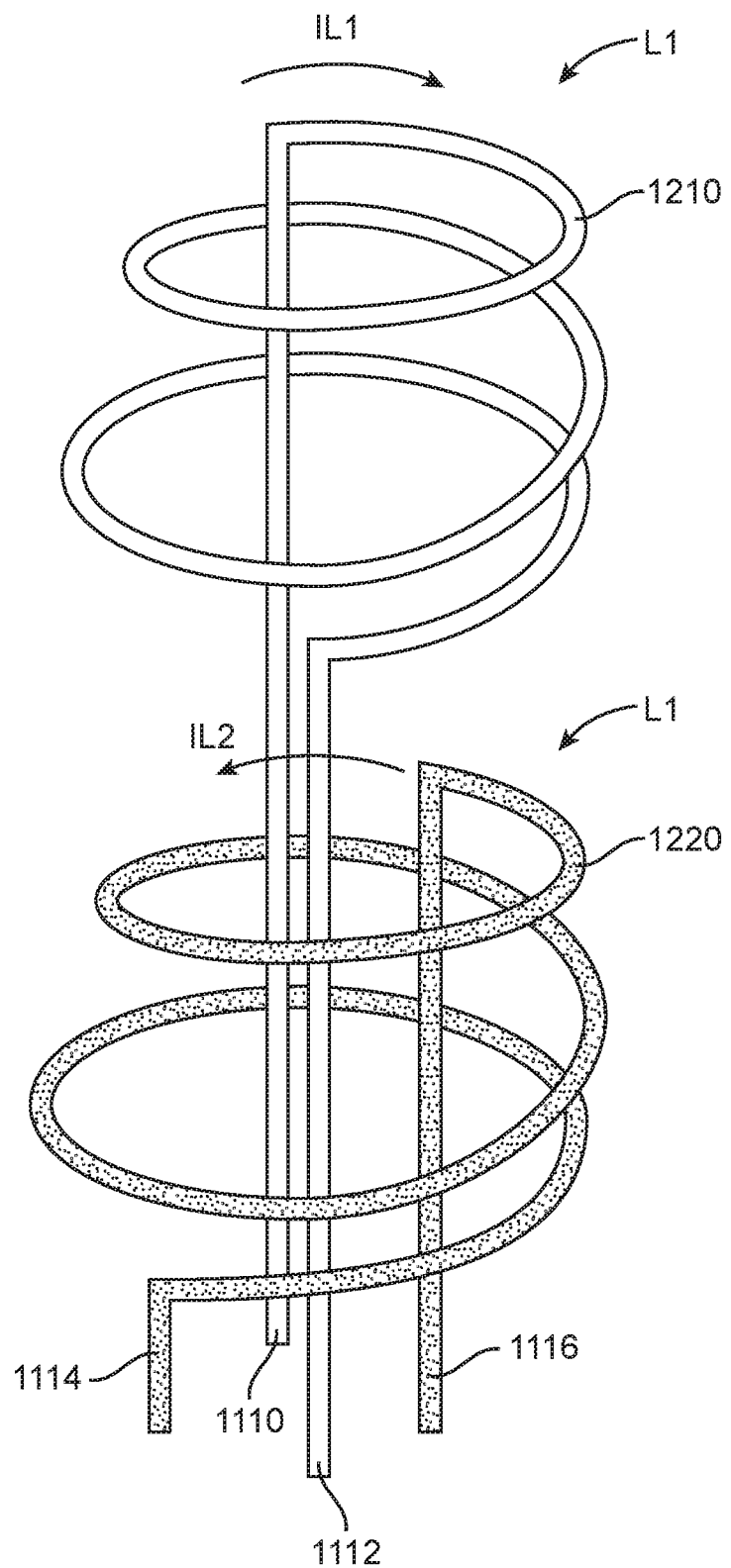
FIG. 12 illustrates a pair of coupled inductors that can be used in the circuitry of FIG. 11.

Inductor L1 in FIG. 3 can be manufactured in various ways. For example, each of two or more levels can include a series of coils or loops that are formed as an Archimedean spiral, one branch of a Fermat's spiral, involute, Atzema spiral, or other type of spiral or pattern. In these or other embodiments of the present invention, the series of coils or loops can follow a helix, conchospiral, or other spiral or pattern. (A helix spiral is shown in FIG. 12.) An example employing an Archimedean spiral is shown in the following figure.

Figure 4:
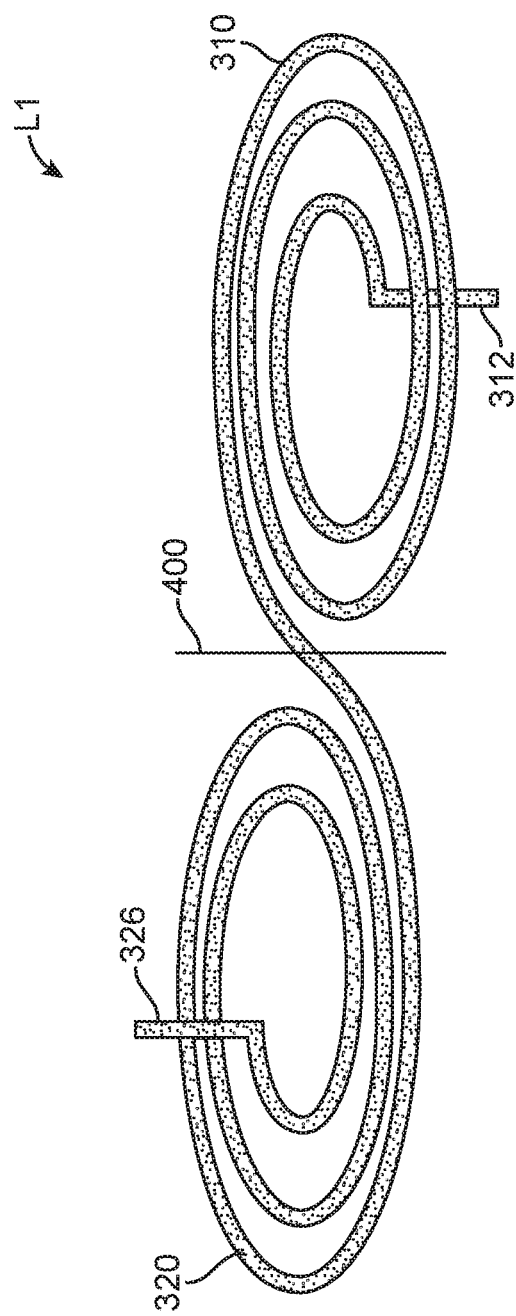
FIG. 4 illustrates a method of manufacturing the inductor FIG. 3.

FIG. 4 illustrates a method of manufacturing the inductor FIG. 3. In this example, a first series of loops 310 and a second series loops 320 can be formed on a single layer. Terminals 312 and 326 can also be formed. The resulting structure can be folded at line 400 such that the second series loops 320 is located above the first series loops 310. Terminal 312 can pass through the first series of loops 310 and can be available at a bottom side of inductor L1. Terminals 312 and 326 can be available on a bottom side of inductor L1 and can be through-hole contacts or surface-mount contacts. These contacts can be soldered to corresponding contacts on a board or other appropriate substrate (not shown.)

In some circumstances, the quietest portion of an inductor might not be at or near an electrical center of the inductor. For example, the quietest portion of the inductor can be significantly closer to one terminal or another of the inductor. In such a case, it can still be desirable to have the quietest portion of the inductor implemented as an outermost loop. However, if both terminals are at a physical center of the inductor, one series of loops can include a larger number of loops than the other. This can be inefficient in terms of space consumed by the inductor. Accordingly, these and other embodiments of the present invention can provide inductors where the terminals are located between the physical center of the inductor and the outermost loops.

In some circumstances, the noisiest portion of an inductor might not be a terminal. In such a case, it can be desirable to have the noisiest part of the inductor implemented at the physical center of the inductor, in order to utilize the shielding provided by the loops of the inductor. Again, this can mean that the terminals might be best positioned between the physical center of the inductor and the outermost loops. An example is shown in the following figure.

Figure 5:
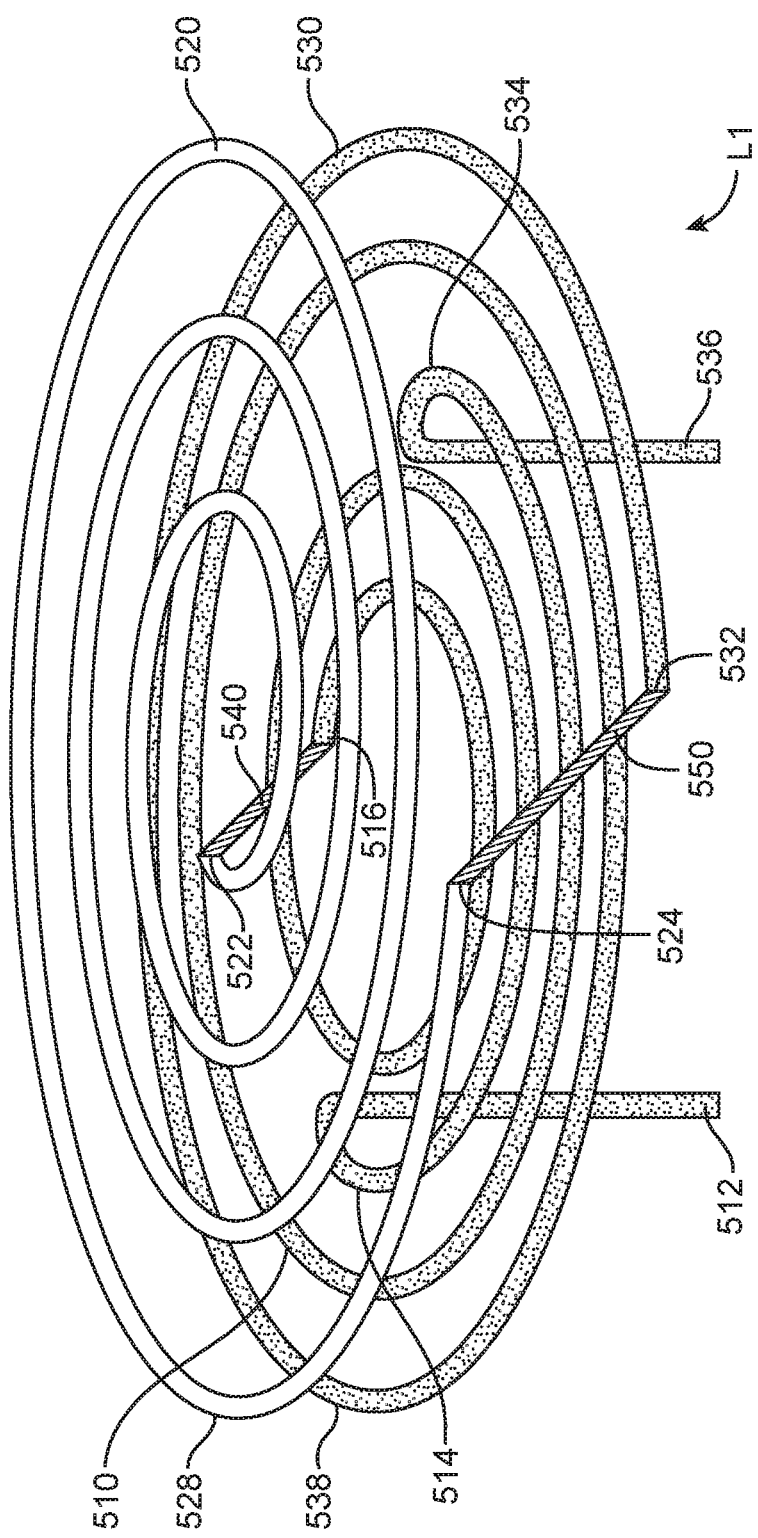
FIG. 5 illustrates another inductor according to an embodiment of the present invention.

FIG. 5 illustrates another inductor according to an embodiment of the present invention. In this example, the location of the quietest signal level in the inductor can be closer to one terminal (536) than the other (512.) In an embodiment of the present invention, if all the loops from terminal 512 to the location of the quietest signal level could be located on a first level and all the loops from the location of the quietest signal level to terminal 536 could be located on a second level. In such an arrangement, the number of loops on the first level might be larger than the number of loops on the second level. Instead, some of the loops from terminal 512 to the location of the quietest signal level could be located on the second level.

In this example, inductor L1 can include a first series of loops 510, a second series of loops 520, and a third series of loops 530. Inductor L1 can have outermost loops 528 and 538. A first terminal 512 can connect to a first end 514 of the first series of loops 510. A second end 516 of the first series of loops 510 can attached to a first level translation 540. The second series of loops 520 can include a first end 522, which can couple to first level translation 540. The second series of loops 520 can terminate at a second end 524, which can be coupled to a second level translation 550. The second level translation 550 can couple to a first end 532 of the third series of loops 530. The third series of loops 530 can terminate at a second end 534, which can be connected to the second terminal 536. The first series of loops 510, the second series of loops 520, and the third series of loops 530, can be arranged as Archimedean spirals. This inductor L1 is shown in the context of a boost regulator in the following figure.

Figure 6:
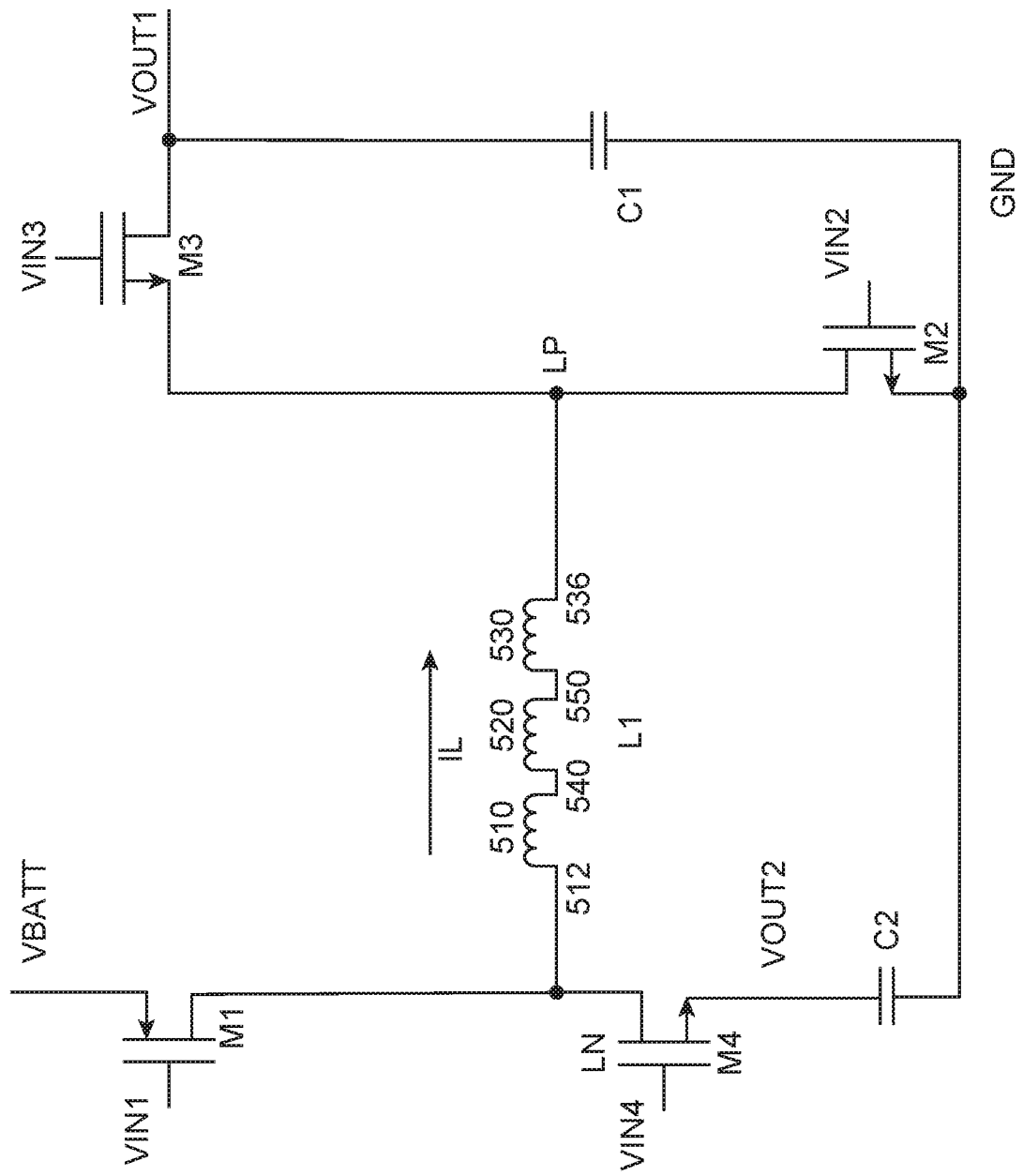
FIG. 6 illustrates another regulator circuit according to an embodiment of the present invention.

FIG. 6 illustrates another electronic circuit according to an embodiment of the present invention. The operation of this circuit can be the same or similar to the circuit shown in FIG. 1. In this example, inductor L1 can be made up of three series of loops 510, 520, and 530. Nodes LN and LP can be connected to terminals 512 and 536 of inductor L1, which can be implemented as connections to middle loops in one layer of inductor L1. The quietest portion of inductor L1 can electrically be closer to terminal 536 than it is to terminal 512. Accordingly, that quite portion can be physically implemented as the outermost loops 528 of the second series of loops 520 and outermost loops 538 of the third series of loops 530, as shown in FIG. 5.

In still other circuit configurations, one terminal of an inductor can see a large signal, while another terminal can be relatively quiet. An example is shown in the following figure.

Figure 7:
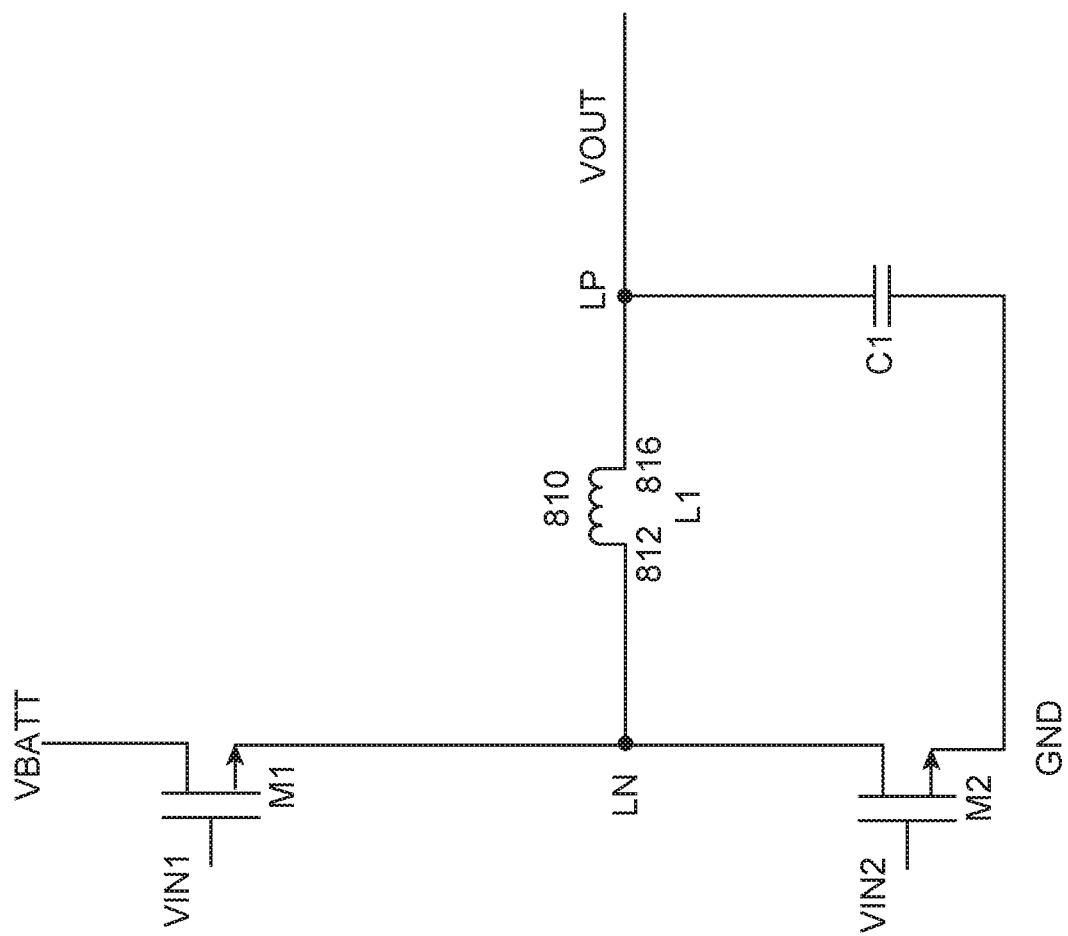
FIG. 7 illustrates a buck regulator according to an embodiment of the present invention.

FIG. 7 illustrates a buck regulator according to an embodiment of the present invention. In this example, transistors M1 and M2 can receive input voltages VIN1 and VIN2 and can drive inductor L1. Current through inductor L1 can charge capacitor C1 and provide an output voltage VOUT. This example, node LN can convey a relatively dynamic signal, while node LP can convey a relatively quiet or non-dynamic signal. Accordingly, terminal 812 can be implemented on an inside loop of inductor L1, while terminal 816 can be implemented as an outermost loop 818 (shown in FIG. 8) of the series of loops 810. An example of such an inductor is shown in the following figure.

Figure 8:
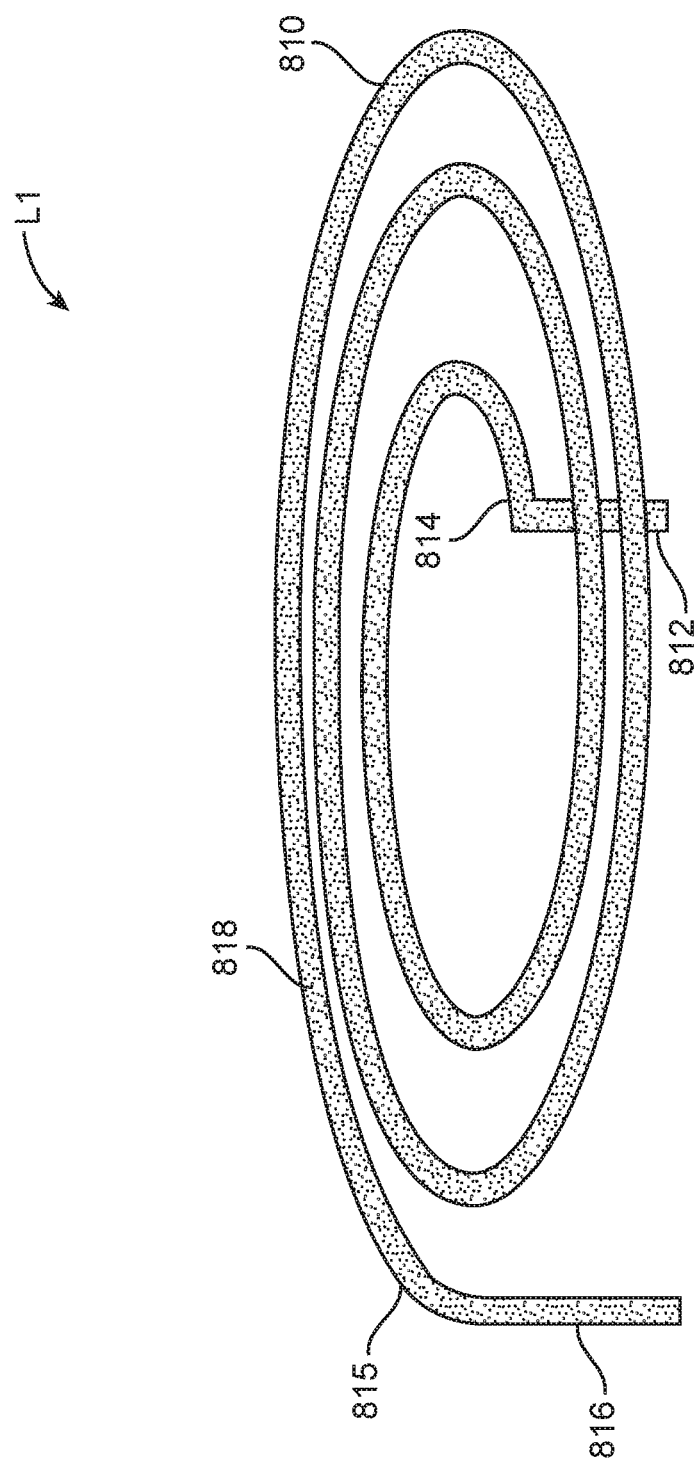
FIG. 8 illustrates another inductor according to an embodiment of the present invention.

FIG. 8 illustrates another inductor according to an embodiment of the present invention. This inductor L1 can include a first terminal 812 connected to a first end 814 of a first series of loops 810. The first series of loops 810 can have an outermost loop 818, which can be coupled at a second end 815 to terminal 816.

These and other embodiments of the present invention can provide a method of selecting an appropriate inductor structure for different circuit topologies. Examples are shown in the following figures.

Figure 9:
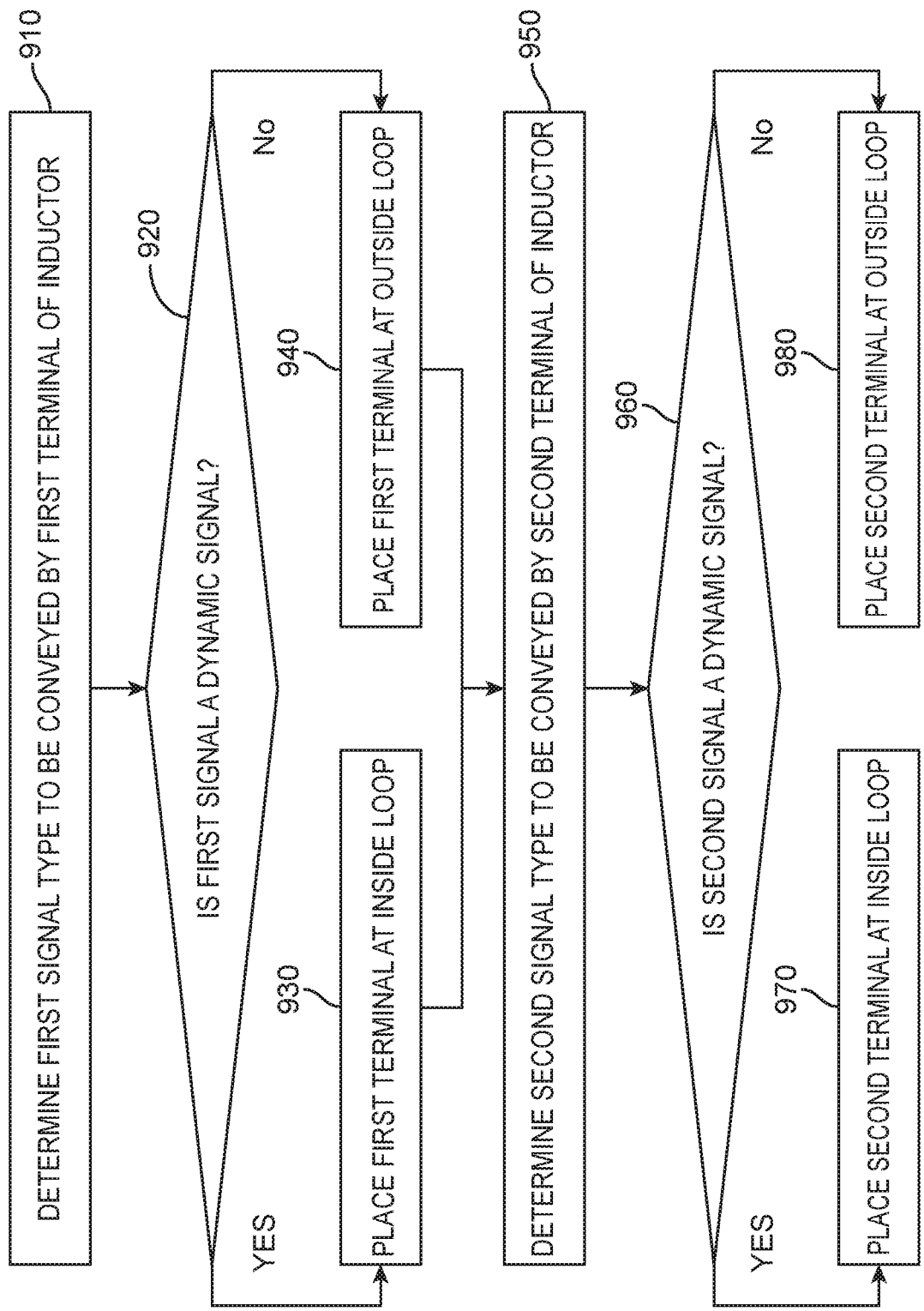
FIG. 9 is a flowchart of a method of designing a circuit according to an embodiment of the present invention.

FIG. 9 is a flowchart of a method of designing a circuit according to an embodiment of the present invention. In act 910, a first signal type to be conveyed by a first terminal of an inductor can be determined. In act 920, it can be determined if the first signal is a dynamic signal. If it is, then in act 930 the first terminal can be placed on the inside loop near a physical center of the inductor. If the first signal is not dynamic signal, the first terminal can be placed on an outermost loop of the inductor in act 940. Placing a terminal at an inside loop of an inductor to help to reduce noise can make routing signals on a board (not shown) more complicated.

In act 950, a second signal type to be conveyed by a second terminal of the inductor can be determined. In act 960, it can be determined if the second signal is a dynamic signal. If it is, then in act 970, the second terminal can be placed on the inside loop near a physical center of the inductor. If the second signal is not dynamic signal, the second terminal can be placed an outermost loop of the inductor in act 980.

In this example, terminals of an inductor can be placed on the inside loop or an outermost loop depending on a type of signal that they convey. In these and other embodiments of the present invention, an electrical portion of an inductor having a minimal amount of signal amplitude can be identified. This electrical portion of the inductor can then be mapped to an outermost loop of the inductor and the terminals can be located to reduce overall inductor size. The total number of loops in this and other embodiments of the present invention can be determined by the desired inductive value, as well as the properties and spacings of the materials used. An example is shown in the following figure.

Figure 10:
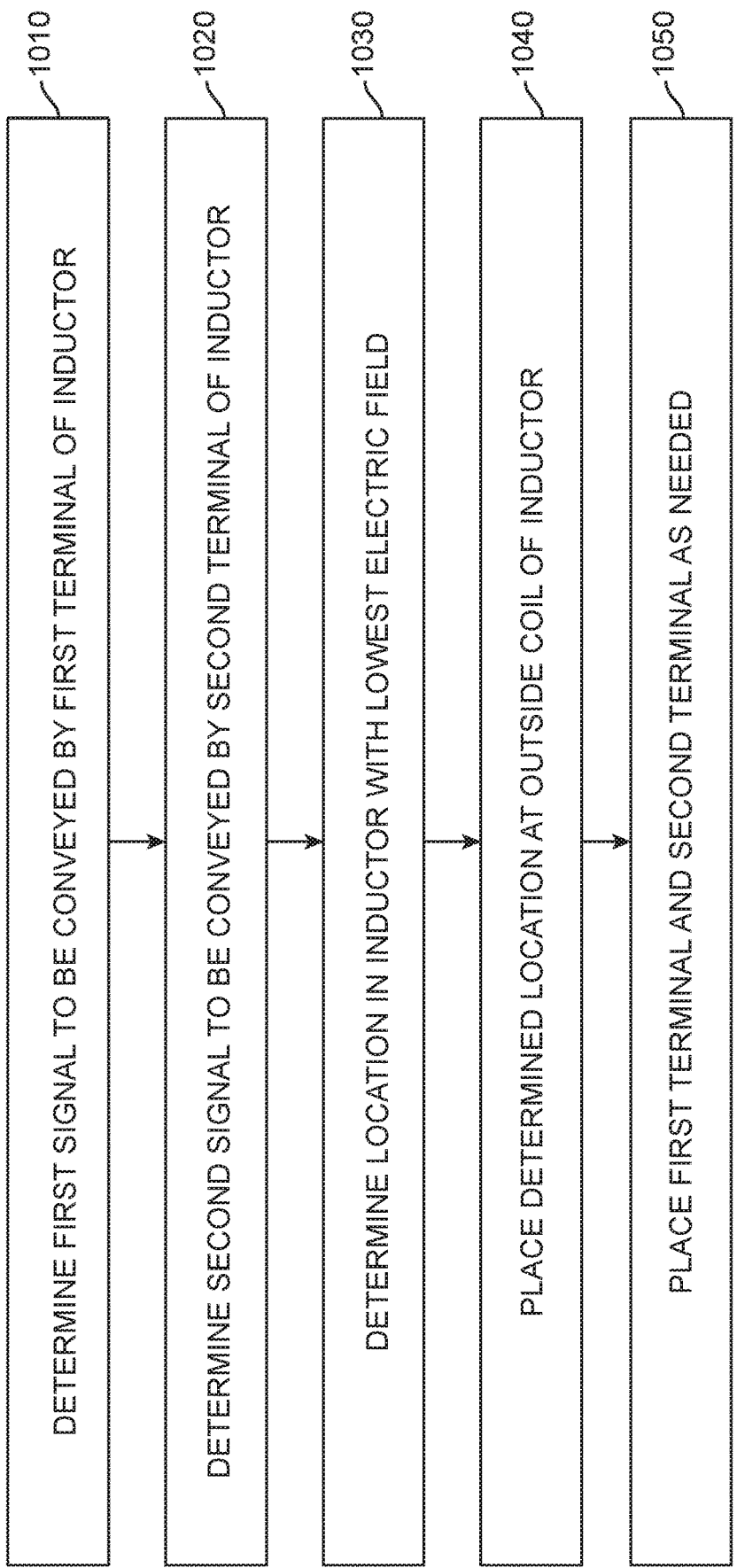
FIG. 10 is a flowchart of another method of designing a circuit according to an embodiment of the present invention.

FIG. 10 is a flowchart of another method of designing a circuit according to an embodiment of the present invention. A first signal to be conveyed by a first terminal of the inductor can be determined in act 1010. A second signal to be conveyed a second terminal the inductor can be determined in act 1020. An electrical location in the inductor that has the lowest electric field can be determined in act 1030. This electrical location can be placed on a physical outermost loop or loops of the inductor. The first terminal and the second terminal can then be placed as needed.

Figure 11:
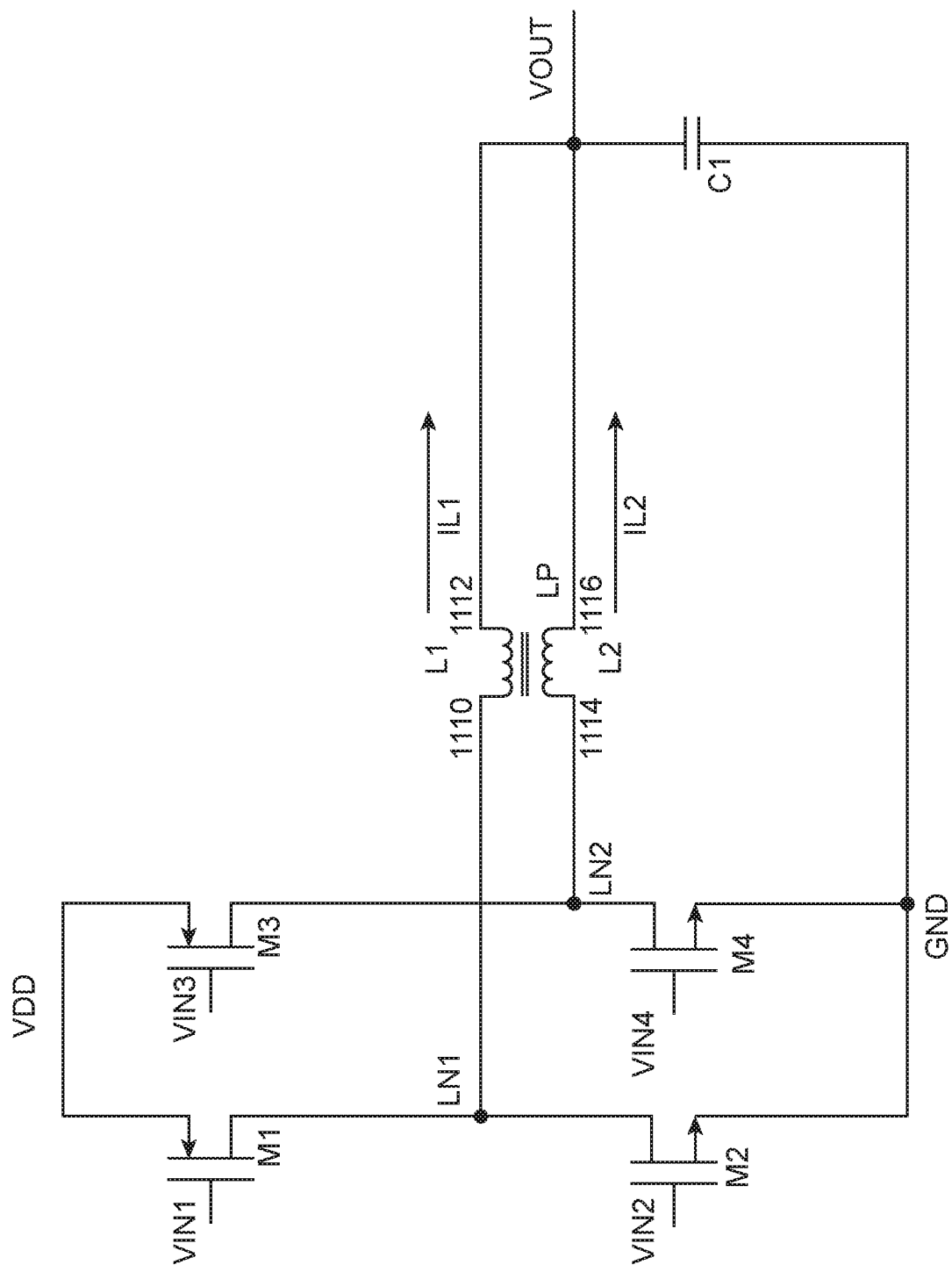
FIG. 11 illustrates another switching regulator according to an embodiment of the present invention.

FIG. 11 illustrates another switching regulator according to an embodiment of the present invention. This example shows a multiphase buck converter that includes coupled inductors L1 and L2. This converter can include two pairs of driving transistors, each coupled to an inductor that provides a charging current to an output capacitor C1 to generate an output voltage VOUT. Specifically, a power supply VDD, which can be a battery voltage, can be received at a source of transistor M1. A drain of M1 can be connected to node LN1, which can be connected to terminal 1110 of inductor L1. Transistor M2 can be connected between node LN1 and ground. A gate of transistor M1 can receive a control signal VIN1, while a gate of transistor M2 can receive a control signal VIN2. The control signals VIN1 and VIN2 can be non-overlapping pulse-width modulated signals and can be generated by control circuitry (not shown) for the converter. The power supply VDD can also be received at a source of transistor M3. A drain of M3 can be connected to node LN2, which can be connected to terminal 1114 of inductor L2. Transistor M4 can be connected between node LN2 and ground. A gate of transistor M3 can receive a control signal VIN3, while a gate of transistor M4 can receive a control signal VIN4. The control signals VIN3 and VIN4 can be non-overlapping pulse-width modulated signals and can be generated by control circuitry (not shown) for the converter.

The second terminal 1112 of inductor L1 can provide current IL1 into capacitor C1 and the second terminal 1116 of inductor L2 can provide current IL2 into capacitor C1 to generate the output voltage VOUT. The coupled inductors can be arranged in proximity to each other such that a current IL1 in inductor L1 generates an electric field that couples to inductor L2, while a current IL2 in inductor L2 generates an electric field that couples to inductor L1. Unfortunately, the electric fields generated by inductors L1 and L2 can also couple to nearby circuits. Accordingly, currents IL1 and IL2 in inductors L1 and L2 can be generated in opposite directions such that their electric fields tend to cancel each other. The electric fields generated by the currents IL1 and IL2 can therefore tend to cancel each other, thereby reducing the electric field generated by this converter, or other circuit employing these inductors. This cancellation or reduction can also help to reduce the saturation level in the cores of inductors L1 and L2, thereby avoiding a derating of inductors L1 and L2, which could otherwise increase their impedance at high current levels.

In this circuit configuration, nodes LN1 and LN2 can receive dynamic signals, while the common node LP can be relatively quiet or non-dynamic. As before, terminal 1110 of inductor L1, which is connected to receive the dynamic signal on node LN1, can be placed near a physical center of inductor L1. Similarly, terminal 1114 of inductor L2, which is connected to receive the dynamic signal on node LN2, can be placed near a physical center of inductor L2. Terminal 1112 of inductor L1, which is connected to provide the non-dynamic signal on node LP, can be either at a physical center or outer edge or loop of inductor L1. Similarly, terminal 1116 of inductor L2, which is connected to provide the non-dynamic signal on node LP, can be either at a physical center or outer edge or loop of inductor L2.

Inductors L1 and L2 can be arranged in various configurations. For example, they can each be a series of coils or loops, where each coil or loop is stacked above (or below) its predecessor. They can also be series of coils or loops on two or more levels, such as the examples shown in FIGS. 3 and 5. Examples are shown in the following figures.

FIG. 12 illustrates coupled inductors that can be used in the circuitry of FIG. 11. Inductor L1 can include a series of loops 1210, where each loop 1210 is stacked above (or below) its predecessor. Inductor L2 can include a series of loops 1220, where each loop 1220 is stacked above (or below) its predecessor. The first series of loops 1210 and the second series of loops 1220 can each follow a helix, conchospiral, or other spiral or pattern. Terminal 1110 can pass through the center of the loops 1210 and 1220. Terminals 1112 and 1116 can pass through the center of loops 1220. In this example, current IL1 in inductor L1 can flow from terminal 1110 to terminal 1112. Current IL1 can flow through loops 1210 in a clockwise direction as shown. Current IL2 can flow from terminal 1114 to terminal 1116. Current IL2 can flow through loops 1220 in a counter-clockwise direction as shown. The electric fields generated by the currents IL1 and IL2 can therefore tend to cancel each other, thereby reducing the electric field generated by the converter in FIG. 11, or other circuit employing these inductors. This cancellation or reduction can also help to reduce the saturation level in the cores of inductors L1 and L2, thereby avoiding a derating of inductors L1 and L2, which could otherwise increase their impedance at high current levels.

Figure 13:
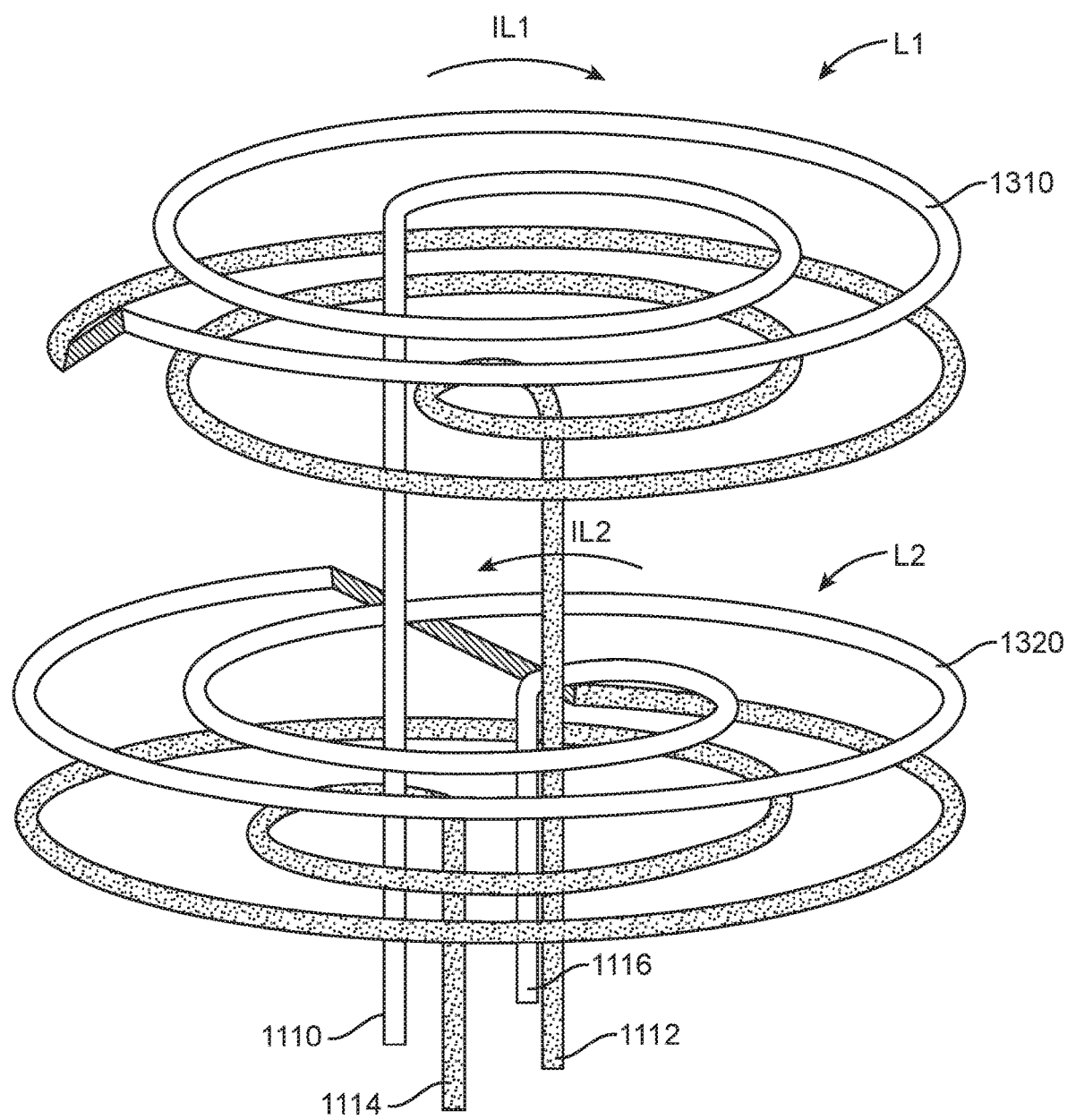
FIG. 13 illustrates another pair of coupled inductors that can be used in the circuitry of FIG. 11.

FIG. 13 illustrates another pair of coupled inductors that can be used in the circuitry of FIG. 11. Inductor L1 can be series of loops 1310 on two or more levels. Inductor L2 can be series of loops 1320 on two or more levels. These loops 1310 and loops 1320 can each form an Archimedean spiral, one branch of a Fermat's spiral, involute, Atzema spiral, or other type of spiral. Terminal 1110 can pass through the center of the loops 1310 and 1320. Terminals 1112 and 1116 can pass through the center of loops 1320. In this example, current IL1 in inductor L1 can flow from terminal 1110 to terminal 1112. Current IL1 can flow through loops 1310 in a clockwise direction as shown. Current IL2 can flow from terminal 1114 to terminal 1116. Current IL2 can flow through loops 1320 in a counter-clockwise direction as shown. The electric fields generated by the currents IL1 and IL2 can therefore tend to cancel each other, thereby reducing the electric field generated by the converter in FIG. 11, or other circuit employing these inductors. This cancellation or reduction can also help to reduce the saturation level in the cores of inductors L1 and L2, thereby avoiding a derating of inductors L1 and L2, which could otherwise increase their impedance at high current levels.

Embodiments of the present invention can provide inductors that can be located in various types of devices, such as portable computing devices, tablet computers, desktop computers, laptops, all-in-one computers, cell phones, wearable computing devices, storage devices, portable media players, navigation systems, monitors, power supplies, adapters, remote control devices, chargers, and other devices. These inductors can be implemented using various metal layers on an integrated circuit, in a ceramic package, or in other ways.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. An inductive element comprising:
   a first terminal;
   a first series of loops having a first end coupled to the first terminal and looping outwardly to a second end such that the first terminal is located inside the first series of loops;
   a level translation coupled to the second end of the first series of loops;
   a second series of loops located under the first series of loops and having a first end coupled to the level translation and looping inwardly to a second end; and
   a second terminal coupled to the second end of the second series of loops such that the second terminal is located inside the second series of loops.

2. The inductive element of claim 1 wherein the first terminal is further located inside the second series of loops.

3. The inductive element of claim 1 wherein the first series of loops is on a first physical layer and the second series of loops is on a second physical layer.

4. The inductive element of claim 1 wherein the first series of loops and the second series of loops comprises a same number of loops.

5. The inductive element of claim 1 wherein the first series of loops and the second series of loops comprises a different number of loops.

6. The inductive element of claim 1 wherein the first terminal and the second terminal extend to a bottom side of the inductive element where they form through-hole contacting portions.

7. The inductive element of claim 1 wherein the first terminal and the second terminal extend to a bottom side of the inductive element where they form surface-mount contacting portions.

8. The inductive element of claim 1 wherein the first series of loops are located on a first level and the second series of loops are located on a second level, and the level translation extends from the first level to the second level and is shorter than a single loop.

9. An electronic system comprising a switching regulator, the switching regulator comprising:
   an inductive element having a first terminal and a second terminal, wherein the first terminal and the second terminal are physically located at inside edges of the inductive element;
   a first power transistor having a drain coupled to the first terminal of the inductive element, a source coupled to a power supply, and a gate coupled to receive a first signal;
   a second power transistor having a drain coupled to the first terminal of the inductive element, a source coupled to first voltage output, and a gate coupled to receive a second signal;
   a third power transistor having a drain coupled to the second terminal of the inductive element, a source coupled to ground, and a gate coupled to receive a third signal; and
   a fourth power transistor having a source coupled to the second terminal of the inductive element, a drain coupled to a second voltage output of the switching regulator, and a gate coupled to receive a fourth signal.

10. The electronic system of claim 9 wherein the switching regulator is a single-inductor, multiple output regulator.

11. The electronic system of claim 9 wherein the series of loops of the inductive element are located circumferentially around the inside edge of the inductive element.

12. The electronic system of claim 10 wherein the inductive element comprises:
the first terminal;
a first series of loops having a first end coupled to the first terminal and looping outwardly to a second end such that the first terminal is located inside the first series of loops,
a level translation coupled to the second end of the first series of loops;
a second series of loops located under the first series of loops and having a first end coupled to the level translation and looping inwardly to a second end; and
the second terminal coupled to the second end of the second series of loops such that the second terminal is located inside the second series of loops.

13. The electronic system of claim 12 wherein the first series of loops is on a first physical layer and the second series of loops is on a second physical layer.

14. The electronic system of claim 12 wherein the first series of loops and the second series of loops comprises a same number of loops.

15. The electronic system of claim 12 wherein the first series of loops and the second series of loops comprises a different number of loops.

16. The electronic system of claim 12 wherein the switching regulator is a single-inductor, multiple output regulator.

17. The electronic system of claim 12 wherein the first series of loops are in a first plane and the second series of loops are in a second plane, and wherein the first plane is parallel to the second plane, and wherein the first terminal and the second terminal extend to at least a bottom of the first series of loops.

18. The electronic system of claim 12 wherein the first series of loops are located on a first level and the second series of loops are located on a second level, and the level translation extends from the first level to the second level and is shorter than a single loop.

19. The electronic system of claim 10 wherein the inductive element comprises:
the first terminal;
a first series of loops having a first end coupled to the first terminal and looping inwardly to a second end such that the first terminal is located outside the first series of loops,
a first level translation coupled to the second end of the first series of loops;
a second series of loops located above the first series of loops and having a first end coupled to the first level translation and looping outwardly to a second end;
a second level translation coupled to the second end of the second series of loops;
a third series of loops located below the second series of loops and having a first end coupled to the second level translation and looping inwardly to a second end; and
the second terminal coupled to the second end of the third series of loops such that the second terminal is located inside the third series of loops.

20. The electronic system of claim 19 wherein the first and second terminals are located between the first series of loops and the third series of loops.

21. The electronic system of claim 20 wherein the first series of loops and the third series of loops are on a same level.

22. The electronic system of claim 21 wherein the first series of loops and the third series of loops comprise a first number of loops, the second series of loops comprises a second number of loops, and wherein the first number of loops and the second number of loops are equal.

23. The electronic system of claim 21 wherein the first series of loops and the third series of loops comprise a first number of loops, the second series of loops comprises a second number of loops, and wherein the first number of loops and the second number of loops are different.

24. The electronic system of claim 19 wherein the first series of loops and the third series of loops are on a first level and the second series of loops are on a second level, the first level translation extends from the first level to the second level and is shorter than a single loop, and the second level translation extends from the second level to the first level and is shorter than a single loop.

* * * * *